United States Patent [19]

Dugge

[11] Patent Number: 4,718,795
[45] Date of Patent: Jan. 12, 1988

[54] UNLOADING OUTLET ASSEMBLY

[75] Inventor: Richard H. Dugge, St Louis, Mo.

[73] Assignee: ACF Industries, Incorporated, Earth City, Mo.

[21] Appl. No.: 52,185

[22] Filed: May 18, 1987

Related U.S. Application Data

[60] Continuation of Ser. No. 740,632, Jun. 3, 1985, abandoned, which is a division of Ser. No. 349,789, Feb. 18, 1982, Pat. No. 4,544,306.

[51] Int. Cl.$^4$ ............................................. B65G 53/66
[52] U.S. Cl. ..................................................... 406/30
[58] Field of Search ........................ 406/14, 24, 25, 30, 406/32, 119, 123, 181

[56] References Cited

U.S. PATENT DOCUMENTS

| | | | |
|---|---|---|---|
| 2,826,459 | 3/1958 | Oetiker | 406/30 |
| 2,901,133 | 8/1959 | Weller | 406/119 |
| 3,182,954 | 5/1965 | Borger | 406/119 |
| 3,378,310 | 4/1968 | Christensen | 406/109 X |
| 3,624,802 | 11/1971 | Ripert | 251/31 |
| 3,727,985 | 4/1973 | Reuter | 406/30 X |
| 4,278,365 | 7/1981 | Sandberg | 406/30 |
| 4,353,667 | 10/1982 | Mandl et al. | 406/30 |

FOREIGN PATENT DOCUMENTS

| | | | |
|---|---|---|---|
| 751270 | 1/1967 | Canada | 406/119 |
| 1261918 | 1/1972 | United Kingdom | 406/30 |

Primary Examiner—Jeffrey V. Nase
Attorney, Agent, or Firm—Polster, Polster and Lucchesi

[57] ABSTRACT

The difference in the pressure drop in a pneumatic discharge conduit between at least one discharge outlet into the conduit and a point downstream of the discharge outlet caused by lading in the discharge conduit is used to control opening and closing of the lading outlet valve to automatically control pneumatic unloading of lading from a container. In one application, the container is a railway hopper car having a plurality of pneumatic discharge outlets which discharge into a pneumatic discharge conduit.

3 Claims, 4 Drawing Figures

UNLOADING OUTLET ASSEMBLY

This is a continuation of application Ser. No. 740,632, filed on June 3, 1985, now abandoned, which is a divisional of application Ser. No. 349,789, filed Feb. 18, 1982, now U.S. Pat. No. 4,544,306, granted Oct. 1, 1985.

IN THE DRAWINGS

BACKGROUND OF THE INVENTION

This invention relates to automatic control of pneumatic discharge of particulate material from a container.

Normally in pneumatic discharge operations the attendant manually opens and closes lading valves located between a container to be unloaded and a pneumatic discharge conduit used to convey the material away from the container.

This can be time consuming, for example, in unloading a train of a hundred hopper cars in which each car includes three pneumatic discharge outlets.

Furthermore for higher capacity hopper cars it has been proposed to increase capacity of the cars by eliminating the void space between adjacent hoppers and locating a series of relatively small outlets in the bottom of one or two large hoppers. As many as ten (10) or more discharge outlets would be utilized per large hopper. If these discharge outlets were to be manually opened and closed additional railway attendants would be required which would add expense to the unloading operation.

SUMMARY OF THE INVENTION

The object of the invention is to provide an automatic unloading system for pneumatic discharge of particulate material.

Another object of the invention is to reduce the cost of pneumatic discharge of particulate material from railway hopper cars, particularly those of high capacity, having a plurality of pneumatic discharge outlets.

In accordance with the present invention, pressure sensing means are provided to at least periodically determine the pressure drop between at least one pneumatic discharge outlet and a point in a pneumatic discharge conduit downstream of the pneumatic discharge outlet. The sensing means sense corresponding changes in pressure drop resulting from more or less particulate material being discharged through the discharge conduit. The pressure sensing means is connected to control means for controlling the opening and closing of one or a plurality of pneumatic discharge outlets in fluid communication with the discharge conduit.

In one embodiment the pressure drop is constantly monitored. For example, the pressure sensing means may comprise a bleed air conduit connected into the discharge conduit downstream of the discharge outlet and a pitot tube is located in this bleed air conduit to measure the pressure drop.

In another embodiment, the control means comprises switch means having electrical contact means which are activated by prescribed pressure drop ranges. The electrical contact means are electrically connected to drive means which move valve means in at least one pneumatic discharge outlet between open and closed positions corresponding to the pressure ranges sensed by the switch means. Timing means working in concert with the switch means may be provided to close one or more pneumatic discharge valves after a predetermined time sequence has elapsed.

DESCRIPTION OF PREFERRED EMBODIMENTS

Figure 1:
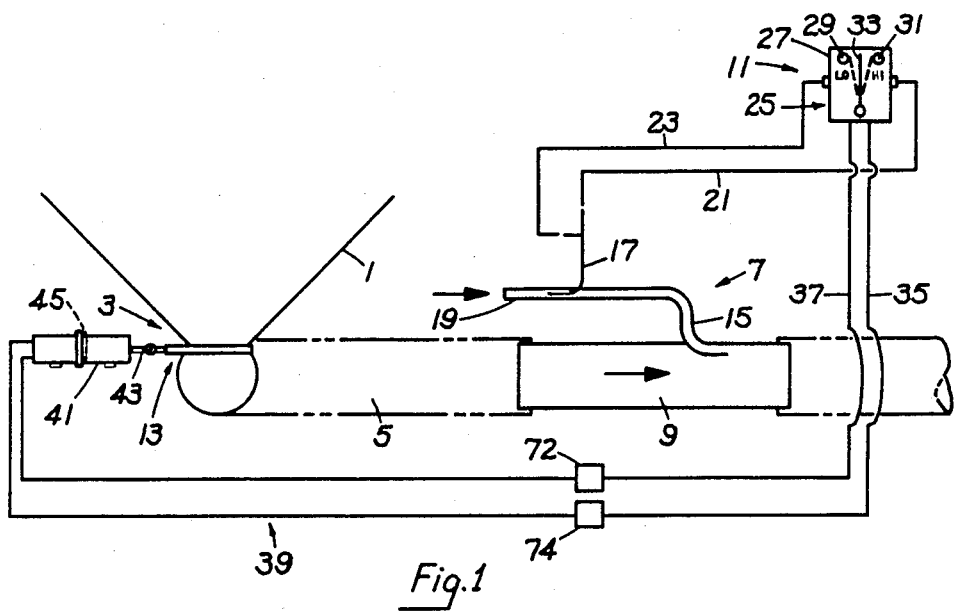
FIG. 1 is a schematic view of one embodiment of the present invention.

In FIG. 1, a container 1 includes a pneumatic discharge outlet 3 and is in fluid communication with a pneumatic discharge conduit 5 which is open to the atmosphere at the opposite end of container 1. Pressure sensing means 7 are located at a location 9 downstream of the discharge outlet 3, which at least periodically senses the difference in pressure between the discharge outlet 3 and the location 9 corresponding to the amount of particulate material being discharged through discharge conduit 5. Control means 11 are provided which control movement of discharge outlet valve means 13 in accordance with the pressure differential sensed by pressure sensing means 7.

Pressure sensing means 7 includes a bleed air conduit 15 containing a pitot tube 17 and is open at its end 19 for air to enter. The velocity of air entering tube 15 is monitored. This velocity is a measure of the pressure differential. Flexible conduits 21 and 23 transfer this velocity or pressure differential to control means 11.

Specifically, control means 11 includes a switch means 25. Switch means 25 comprises a pressure sensitive contact switch 27 including electrical contacts 29 and 31 and a movable pressure sensitive switch elemet 33. Pressure sensitive contact switches 27 are commercially available, for example, Dwyer Model 1640, available from Dwyer Instruments, Inc., P.0. Box 373, Michigan City, Ind. 46360. Pressure limits can be set on switch 27 whereby switch element 33 will engage contacts 29 and 31 at desired pressure differentials. Engagement with contact member 29 will open valve means 13 and engagement with contact member 31 will close valve means 13. If switch element 33 contacts neither, the valve means remains in the pre-set open position.

Electrical lines 35 and 37 transfer electrical signals from contacts 31 and 29 to a valve drive means indicated at 39. Valve drive means may comprise a fluid cylinder activated by a solenoid valve, and having a piston therein which is connected to the valve means 13. A wide variety of suitable valve drive means are available and the invention is not to be construed as limited to the particular valve drive means. For example, an electric motor may be used to drive a pinion which drives a rack connected to valve means 13. Other valve drive means will be apparent to those skilled in the art.

In one embodiment, the valve drive means 39 comprises a fluid cylinder 41 containing a piston 43 having a piston head 45 which is movable by means of fluid pressure applied to either side of the piston head to move the valve means 13 back and forth. Electrical signals from switch 27 transferred through lines 35 and 37 activate solenoid valves 72 or 74 which allows fluid pressure to enter one side or the other of fluid cylinder 41.

In the operation of the apparatus illustrated in FIG. 1 as an example, pressure sensitive contact switch 27 may be set such as the switch element 33 will engage contact 29 at pressures of 10" of water or below. Contact 33 will engage contact 31 at pressures of 11" of water or more. Thus when the unloading is to proceed, vacuum suction is co-menced through conduit 5 and the electrical and fluid circuitry is turned on, the switch element 33 will first engage the contact 29 because the pressure differential between the valve means 13 and the point 9 will be initially very small. It is to be born in mind that discharge conduit 13 at the opposite side of container 1 is open to the atmosphere. Engagement of switch element 33 with contact 29 will cause fluid preferably compressed air to enter the right hand side of the cylinder 41 and move the valve means 13 toward open position. This movement toward open position will continue until the pressure differential reaches more than 10" of water. The fluid circuit is designed such that this will in all liklihood occur before the valve reaches the full open position. The timing of movement of the valve between open and closed position is controlled with a fluid orifice (not shown) or by sizing of the fluid conduits. After the pressure differential exceeds 10" of water, the lading will continue to flow out of the container 1 due to the applied vacuum suction in accordance with conventional pneumatic unloading techniques. Typically a 3" air cylinder having a piston stroke of four (4) inches may be used. The air supply conduits may be ⅜" to ⅝" with a ¼" orifice placed in the inlets to cylinder 41 to control timing of movement of the valve.

However, it may occur that the vacuum suction pressure causes a large amount of material to be discharged and a resulting increase in pressure differential to 11" of water or greater. When this occurs the switch element 33 will engage the contact 31. By virtue of solenoid valve 74, this will cause air pressure to enter the left hand side of the cylinder 13 and cause the valve means 13 to move toward closed position. Valve means 13 will move toward closed position as long as the pressure drop is more than 11" of water. It may become entirely closed. In this event no lading would be pneumatically discharged and an open circuit would occur through the discharge conduit 5. After a period of time, the pressure would reduce to a level below 10" of water which would then cause the switch element 33 to engage the contact 29 and a valve means 13 move to open position by application of fluid pressure to the right hand side of the cylinder 41.

As the operation results in nearly all of the lading being removed, the pressure will gradually decrease. This will cause the valve to move to the full open position. After all of the lading has been pneumatically discharged, the pressure will be quite low. The attendant must then manually turn off the operation and, if desired, connect the discharge conduit 5 to another outlet.

However, it will be apparent that the attendant need not manually monitor the valve means 13 and that it is automatically monitored and moved between open and closed positions by virtue of the pressure sensing means 7 and the control means 11.

Figure 2:
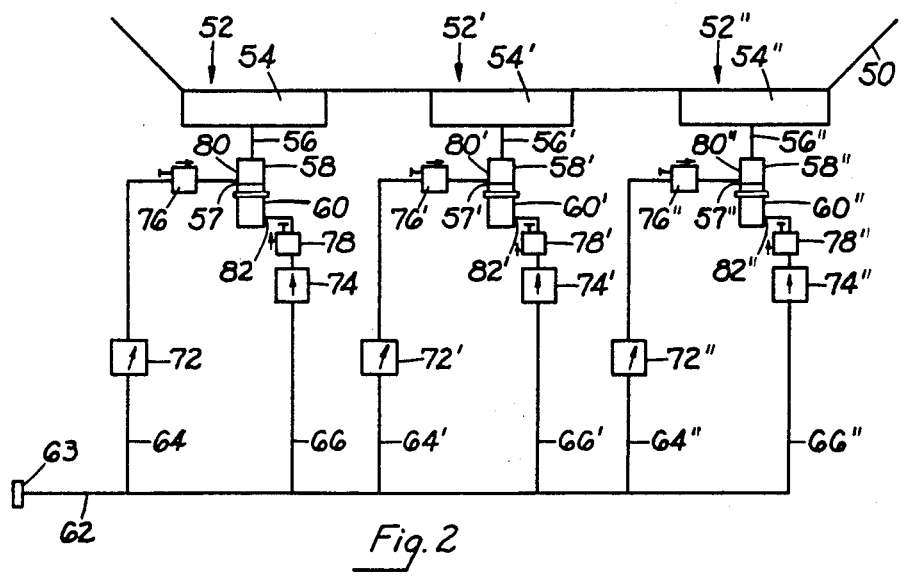
FIG. 2 is a schematic view of another embodiment of the present invention used to control several hopper outlets.
Figure 3:
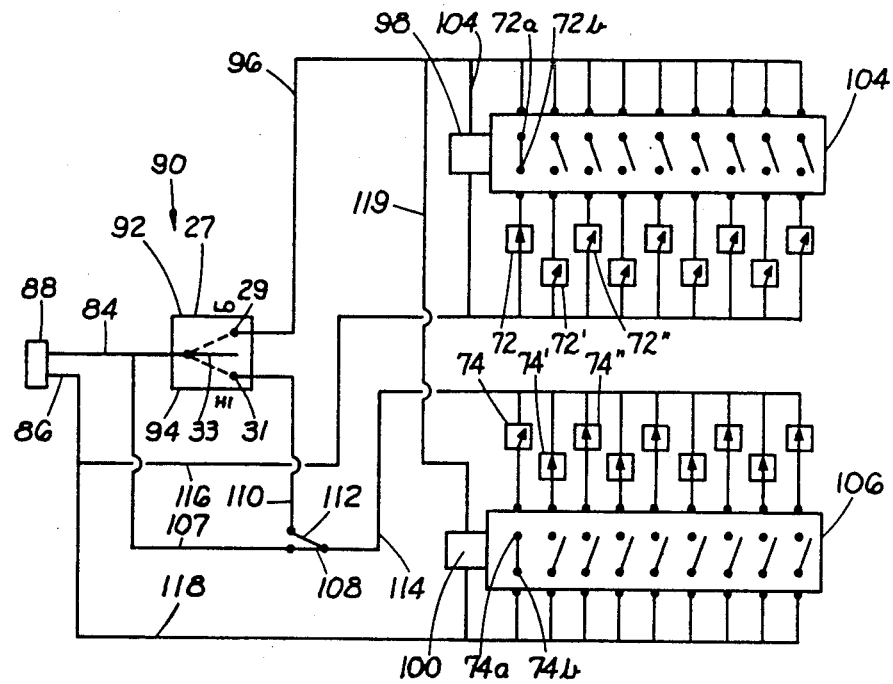
FIG. 3 is a control system including a pair of timers which may be utilized to control operation of the embodiment in FIG. 2.

Another embodiment of the invention is illustrated in FIGS. 2 and 3 wherein timing means is utilized in concert with the control means.

FIG. 2 illustrates a plurality of pneumatic discharge outlets 52, 52' and 52" from a container 50. Each of the outlets is provided with a valve means 54, 54', 54". Piston rods 56, 56', 56" are connected to the respective valve means. The pistons have heads 57, 57', 57" located within fluid cylinders 58, 58', 58". The cylinders include a second portion 60, 60', 60" to receive fluid pressure on the other side of heads 57, 57', 57".

A fluid pressure line 62 includes a conventional quick connect/disconnect fitting 63. The line 62 provides fluid pressure for each side of the piston heads 57, 57', 57". Thus to each of the fluid cylinders 58, 58', 58" the line 62 is connected to and in fluid communication with a pair of pressure lines 64, 66, 64', 66', 64", 66". Each of the lines include a check valve 68, 70, 68', 70', 68", 70". Each of the lines are provided with respective solenoid valves 72, 74, 72', 74', 72", 74". Solenoid valves 72, 74, 72', 74', 72", 74" are activated by the electrical system illustrated in FIG. 3 to be described hereinafter. Each of the lines 64 and 66 includes respective quick exhaust valves 76, 78, 76', 78', 76", 78". The respective lines 64 and 66 then enter ports 80, 82, 80', 82', 80", 82" to supply fluid respectively to fluid cylinders 58, 58' and 58".

An electrical system for controlling the fluid circuit in FIG. 2 is illustrated in FIG. 3. Electrical lines 84 and 86 are connected to an electrical quick connect/disconnect plug 88 of conventional construction. Line 84 is connected to a switch means indicated generally at 90. Switch means 90 may comprise a pressure activated switch 27 described in connection with FIG. 1. Switch 27 comprises a switch element 33 and contacts 29 and 31 which the switch element 33 engages at prescribed pressure drop levels. Pressure lines 92 and 94 are connected through plug 88 to a pitot tube of the type illustrated at 15 in FIG. 1 containing a pressure sensitive element 17. One electrical line 96 extends from contact 29 to timing motors 98 and 100 to timers 104 and 106. Timer 104 controls sequential operation of solenoid valves 72, 72', 72", etc., while timer 106 controls sequential operation of solenoid valves 74, 74', 74", etc. Another line 107 extending from line 84 is connected to a relay 108. Another electrical line 110 extends from contact 31 to relay 108. Relay 108 contains movable contact 112 which in one position is in electrical communication with line 107 and in another position is in electrical communication with line 110 downstream of relay 108. Line 114 extends to solenoid valves, 74, 74', 74" shown in FIG. 2. Another electrical line 116 extends from line 86 to motor 98 and to solenoid valves 72, 72', 72". Another line 118 extends from line 86 to motor 100 and to timer 106. Another line 119 connects motor 100 with line 96. Thus valves 72, 74, 72', 74', 72", 74" respectively are sequentially actuated by timers 104 and 106 which run at the same speed. Note contacts 72a, 72b, 74a, 74b on respective timers 104 and 106.

It will also be apparent that the electrical system can control the operation of as many valve means as there are for the number of outlets being unloaded. Obviously, the system is not limited to the three which are illustrated in FIG. 2. It is possible to use a 3-way solenoid valve with or without a quick exhaust valve.

As an example, solenoid valves 72, 72', 72" may be 2-way, normally closed solenoid valves such as Skinner No. L2DB4150. Solenoid valves 74, 74', 74" normally open, may be Skinner LP1DB4150. Timers 104 and 106 may be multiphase repeat cycle timers, for example, Eagle Signal Bulletin 340. Lines 116 and 118 are connected from line 86 respectively to timer motors 98 and 100 and to contact elements for timing members 104 and 106. In use, solenoid valves 74, 74' and 74" are normally open. The application of air pressure without electrical power will insure that all valves 54 are closed because solenoid valves 74 are normally open. Thus it is seen that in arrival at destination the valves 54, 54' and 54" will be closed.

In operation, pressure limits are set for the pressure sensitive means 90. For example, the pressure drop level of 10" of water or lower for contact element 29 and 11" of water or higher for contact element 31 may be used. Other pressure drops are suitable for some applications. Quick connect/disconnect electrical plug 88 is plugged into a suitable source of 110 volt electrical power. This electrically engages timing motors 98 and 100 which activates respectively solenoid valves 72 and 74 which control movement of outlet 54. Fluid quick connect member 63 is connected to a suitable source of fluid pressure such as air pressure having a pressure of at least 20 psi. Since solenoid valve 74 has been electrically activated, the pressure applied to line 66 will be interrupted allowing quick exhaust valve 78 to dump. At the same time, fluid pressure through line 64 opens normally closed valve 72 and applies fluid pressure through check valve 76 and port 80 into cylinder 58. This moves piston 56 and valve member 54 toward open position. Valve 54 will move toward open position so long as the pressure drop does not exceed 10" of water. As long as pressure is between 10 and 11" of water, the valve will remain stationary. As greater amounts of lading are unloaded through discharge conduit 5, the pressure may exceed 11" of water, in which case valve 74 will apply fluid pressure to the other side 60 of cylinder 58 and move the valve toward closed position. The valve may temporarily become fully closed. However, the pressure drop will again be reduced and valve 54 will move to open position. Near the end of the operation, the pressure will be on the low side (below 10" of $H_2O$). The period of time that the timing motor 98 is running is controlled so that there is sufficient time for clean-out of the outlet. This time period may be, for example, from 1 to 10 minutes. However, after this time period has elapsed, timer 104 will switch to valve 72' and timer 106 will switch to valve 74'.

The unloading process will then be repeated relative to outlet 52'. The applied fluid pressure will first dump through quick exhaust valve 78' and then pressure applied through line 64' and valve 72' will apply fluid pressure into cylinder 58' until the pressure exceeds the set limits such as 10" of water. After unloading has occurred through outlet 52' at the end of the operation, the pressure will again be on the low side. The time of this low pressure is monitored through the timer 104. After the prescribed clean-out period has elapsed, valves 72' and 74' are electrically disengaged and valves 72" and 74" are engaged by timers 104 and 106. The process is then repeated during unloading of this outlet. Any number of outlets can be so controlled and unloaded in sequence. It is thus seen that the timing means 104 and 106 provide for sequential automatic unloading of a series of outlets from a hopper 50.

It is to be noted that the unloading technique of the present invention is adaptable to any unloading operation wherein the pressure differential between the container and an unloading conduit or collecting chamber can be sensed. This pressure differential can be sensed with a pitot tube, or it may be sensed electrically for example by measuring the voltage applied to an electric motor used for vacuum suction. Other pressure measuring arrangements will be apparent to those skilled in the art.

It is apparent, however, that this unloading technique may be applied to gravity unloading of railcars so long as the pressure differential exists and can be measured in the pneumatic system conveying the material to storage.

Figure 4:
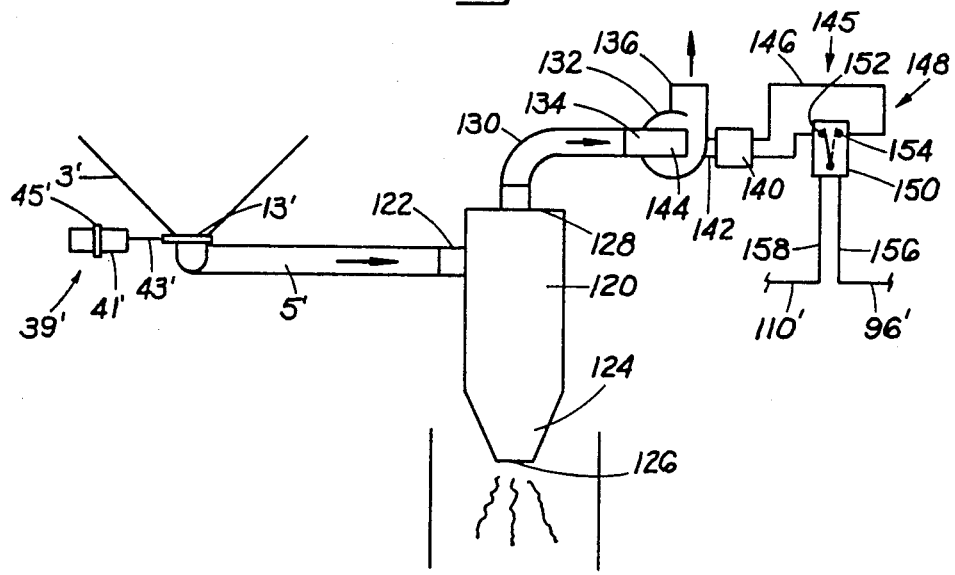
FIG. 4 is a schematic illustration of another embodiment of the present invention, wherein the change in current is used to control opening and closing of the outlet valve.

Another embodiment of the present invention is illustrated in FIG. 4. In this embodiment a container or hopper 3' is provided with a valve means 13' which is movable between open and closed position by means of suitable drive means 39'. For example, drive means 39' may comprise a cylinder 41' having a piston therein 43' with a head 45' located with the cylinder 41'. A pneumatic discharge conduit 5' is connected to a pneumatic separater 120 having an inlet connection 122. Particulate material is discharged from a bottom portion 124 through an opening 126. Gaseous material is discharged through an upper opening 128 and is conveyed by means of a conduit 130 to a blower 132 having an inlet 134. Blower 132 is provided with an air outlet chamber 136. Blower 132 is driven by an electric motor 140 having a drive shaft 142 which drives an impeller 144.

Electric motor 140 is of the constant voltage type, constant speed type. Current varies as the load created by the pressure drop which impeller 144 sees varies. Current sensing means indicated generally at 145 are provided to sense the change in current which occurs as a result of the difference in pressure drop in the impeller 144. The current sensing means 145 includes an electrical line 146 into which is inserted switch means 148.

Switch means 148 comprises a switch 150 which contains a high current contact 152 and a low current contact 154. For example Simpson Model 3323 A1XA; Simpson Electric Company, 853 Dundee Ave., Elgin, Ill. Current ranges may be set by which a current level below a selected amperage such as 20 amps. will activate current flow through a line 156 which is connected to a line 96' similar to line 96 in FIG. 3. High current levels will activate an electrical line 158 which is connected to a line 110' similar to line 110 in FIG. 3. Lines 96' and 110' function to place the valve assembly illustrated in FIG. 2 in sequential operation by virtue of the electric motors 98 and 100 and the timers 104 and 106. The operation is the same. The only difference is that the current is sensed by the sensing means 145 and the switch means 148, whereas in the embodiment shown in FIGS. 1 and 3, the pressure difference is sensed. Of course, the difference in current results from the difference in pressure in the air inlet chamber 132, so that from one viewpoint the difference in pressure is still being sensed. However, it is being sensed electrically in the embodiment shown in FIG. 4 by virtue of the variation in current rather than sensing the pressure as is done in FIGS. 1 and 3.

In another specified example of the present invention, a 220 volt 3-phase motor 140 of 60 horse power is used to drive a 1,000 cubic feet per minute blower 144 of the positive displacement type, a switch 150 having a low amp signal point of 45 amps and a high amp signal point of 55 amps is used as the control switch means. Such a device is Simpson Model 3323 A1XA available from Simpson Electric Company, 853 Dundee Ave., Elgin, Ill.

What is claimed is:

1. An unloading system for the discharge of a particulate material from a covered railway hopper car holding a supply of said particulate material to be unloaded, said railway car having at least one discharge opening in communication with said particulate material within said railway car, said unloading system comprising; pneumatic conveying means operatively connectable with said at least one discharge opening, said pneumatic conveying means including a discharge conduit; pressure sensing means for least periodically determining a pressure change within said discharge conduit downstream from said at least one discharge outlet with said pressure change being defined by a first predetermined pressure level within said conduit corresponding to a first flow rate of said particulate material greater than zero and a second predetermined pressure level within said conduit corresponding to a second flow rate of said particulate material greater than said first flow rate; said pressure sensing means being operatively connected to control means so as to control the opening and closing of said at least one discharge outlet for maintaining the flow of lading therefrom between said first and second flow rates until the lading in operative association with said at least one outlet is substantially unloaded.

2. Apparatus for automatically pneumatically unloading a lading of particulate material from a a covered hopper railroad car having a plurality of pneumatic outlets and a pneumatic conduit in fluid communication with each of said penumatic outlets, means for moving air through said conduit and through said pneumatic outlets and for pneumatically conveying the lading from said container, and valve means associated with each of said pneumatic outlets for selectively opening said blocking the flow of lading from a respective said pneumatic outlet, said apparatus having one of said pneumatic outlets discharging said lading at a time, said apparatus including means for sensing changes in the pressure of the air and lading moving through said conduit between a first predetermined pressure level corresponding to a first flow rate of said lading greater than zero and a second predetermined pressure level corresponding to a second flow rate of said lading greater than said first flow rate, means for operating said valve means associated with said one pneumatic outlet in response to said pressure thereby to control the flow of said lading from said one pneumatic outlet and into said conduit so as to maintain the flow of said lading within a predetermined range between said first and second flow rates, and means operable in response to the flow rate of said lading below said predetermined range thereby to permit air to continue to pass through said one pneumatic outlet for a time sufficient so as to ensure that substantially all of the lading in operative communication with said one penumatic outlet has been conveyed from said one pneumatic outlet, for effecting closing of said valve means associated with said one pneumatic outlet, and for opening the valve means associated with another of said pneumatic outlets thereby to effect the pneumatic unloading of the lading from said other pneumatic outlet.

3. Method of automatically, pneumatically unloading a lading of particulate material from a covered hopper railway car or the like, said railway car having a plurality of pneumatic outlets, a pneumatic conduit in fluid communication with said penumatic outlets, means for moving air through said pneumatic outlet and for pneumatically conveying said lading through said conduit, and valve means for each of said pneumatic outlets interposed between its respective said pneumatic outlet and said conduit for opening and blocking the flow of lading from said respective pneumatic outlet into said conduit, said method comprising the steps of:

opening communication between one of said pneumatic outlets and said conduit so as to entrain said lading in the air moving through said conduit;

sensing the pressure of the air and lading moving through said conduit between a first predetermined pressure level corresponding to a first flow rate of said lading greater than zero and a second predetermined pressure level corresponding to a second flow rate of said lading greater than said first predetermined flow rate;

operating said valve means for said one pneumatic outlet in response to said pressure for controlling the flow of said lading through said one outlet thereby to ensure that the flow rate of lading pneumatically conveyed from said one pneumatic outlet is maintained with a predetermined range between said first and second flow rates;

sensing that the lading has been substantially unloaded from said one pneumatic outlet; and effecting closing of said valve means associated with said one pneumatic outlet and opening the valve means associated with another of said pneumatic outlets thereby to effect further pneumatic unloading of the lading via another of said pneumatic outlets.

* * * * *